United States Patent
Yip et al.

(10) Patent No.: US 7,367,122 B2
(45) Date of Patent: May 6, 2008

(54) STEPPED SLEEVE REPAIR OF KNIFE SEAL BORES IN DRIVEN COMPRESSOR HOUSING

(75) Inventors: Susan E. Yip, Peoria, AZ (US); Jeremy N. LyBarger, Chandler, AZ (US); Timothy Thompson, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 596 days.

(21) Appl. No.: 10/966,706

(22) Filed: Oct. 15, 2004

(65) Prior Publication Data

US 2006/0080832 A1    Apr. 20, 2006

(51) Int. Cl.
  B23P 6/00    (2006.01)
  B23P 19/02    (2006.01)
(52) U.S. Cl. ............... 29/888.021; 29/402.12; 29/402.18; 29/458; 29/525; 277/415
(58) Field of Classification Search ........... 29/458, 29/525, 888.021, 888.02, 889.1, 889.2, 402.08, 29/402.09, 402.11, 402.14, 402.18, 402.19; 277/415
See application file for complete search history.

(56) References Cited

U.S. PATENT DOCUMENTS

| | | | |
|---|---|---|---|
| 4,610,698 A | | 9/1986 | Eaton et al. |
| 4,676,717 A | | 6/1987 | Willyard, Jr. et al. |
| 4,764,089 A | | 8/1988 | Strangman |
| 4,997,321 A | | 3/1991 | Adams |
| 5,222,295 A | * | 6/1993 | Dorris, Jr. .............. 29/888.011 |
| 5,295,300 A | | 3/1994 | Garrick, Jr. |
| 5,452,504 A | | 9/1995 | Tatro et al. |
| 5,471,730 A | | 12/1995 | Sackett |
| 5,511,299 A | | 4/1996 | Stockton |
| 6,409,490 B1 | * | 6/2002 | Nemit et al. ............. 418/201.2 |
| 2003/0126733 A1 | * | 7/2003 | Bush et al. .................. 29/458 |

* cited by examiner

*Primary Examiner*—David P. Bryant
*Assistant Examiner*—Sarang Afzali
(74) *Attorney, Agent, or Firm*—Ingrassia Fisher & Lorenz

(57) ABSTRACT

A method is provided for repairing a driven compressor housing including a bore having an inner surface configured to engage a shaft-mounted knife seal. The method includes the steps of removing material from the bore inner surface, press-fitting a sleeve into the bore, and plasma-spraying an abradable coating onto the bore inner surface.

18 Claims, 5 Drawing Sheets

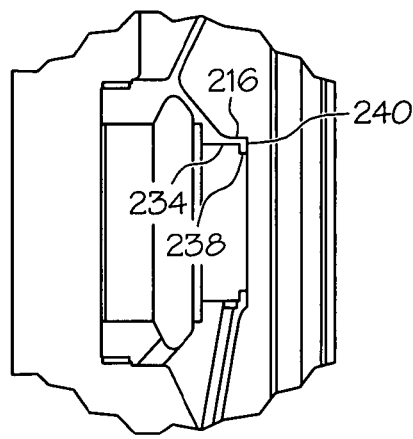
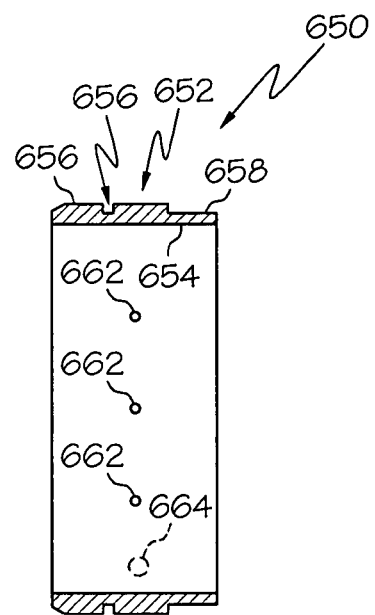
FIG. 5  FIG. 6
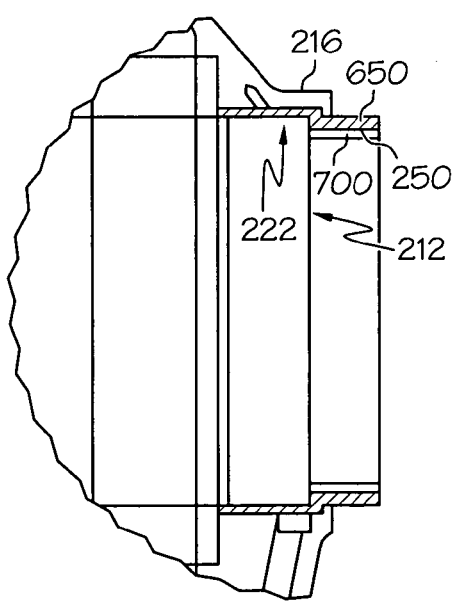
FIG. 7

STEPPED SLEEVE REPAIR OF KNIFE SEAL BORES IN DRIVEN COMPRESSOR HOUSING

TECHNICAL FIELD

The present invention relates to an auxiliary power unit ("APU") and, more particularly, to a repair of the compressor housing of the APU.

BACKGROUND

Many aircraft include one or more auxiliary power units (APUs) to supplement main propulsion engines in providing electrical and/or pneumatic power. An APU may also be used to start the propulsion engines. An APU is, in most instances, a gas turbine engine that includes a combustion section, a power section, a compressor section, and a shaft. The compressor section typically includes an impeller and a compressor. During operation of the APU, air enters through an inlet and is driven by an impeller into the combustion system. The combustion system receives fuel from a fuel source and ignites the compressed air driven therein to produce combusted air. The combusted air produces a thrust that causes the turbine section and shaft to rotate and power a load compressor and generator. The generator supplies supplemental electrical power to the aircraft and the compressor supplies compressed air to the aircraft pneumatic systems. The power from the pneumatic systems may be used to start the main engine or to power air cycle machines in the aircraft that supply air to the aircraft cabin.

In many APU configurations, the compressor is disposed at least partially within a compressor housing that prevents fluids, such as compressed air or lubricants, from leaking into or out of the compressor. The compressor may also include a shaft bearing housing. A seal is typically mounted on the shaft between the shaft bearing housing and the compressor housing that further isolates the interior of the compressor from other aircraft components. In many instances, the type of seal that is used is a knife seal. A knife seal typically includes teeth that are mounted on the shaft and that contact and abrade a coating on the compressor housing when the shaft rotates to thereby seal the interior of the compressor.

During flight operation, the compressor housing and shaft may be exposed to functional vibration. Consequently, the shaft may rub against the housing, and over time, may cause wear and tear on the housing. In the case in which a knife seal is employed, the teeth may dig through the compressor housing coating and cause damage to the housing. When the housing becomes sufficiently worn, it is typically re-coated with the coating material. However, if the housing has suffered extensive wear, it is typically discarded. Unfortunately, a compressor housing is a relatively expensive component to manufacture, and therefore, to replace.

Thus, there is a need for a low cost method for repairing an aircraft compressor housing. Moreover, there is a need for a method of repair that allows an extensively worn compressor housing to be repaired so that the component is salvaged and not discarded. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides methods for repairing a driven compressor housing including a bore having an inner surface configured to engage a shaft-mounted knife seal. In one embodiment, and by way of example only, the method includes the steps of removing material from the bore inner surface, press-fitting a sleeve into the bore, and plasma-spraying an abradable coating onto the bore inner surface.

In another embodiment, methods are provided for repairing a driven compressor housing having a stepped outer surface and a bore configured to engage a shaft-mounted knife, wherein the stepped outer surface has a first step and a second step, the bore has an inlet, an outlet, and inner surface extending therebetween, the inner surface having a first step and a second step, wherein the diameter of the inner surface first step is smaller than the diameter of the inner surface second step and the outer surface first step is shorter than the inner surface first step. The method includes the steps of removing a section of the housing between the outer surface first step and the inner surface first step and removing material from the bore inner surface second step to form a sleeve retention surface having a first diameter and a lip surface having a second diameter, wherein the second diameter is smaller than the first diameter and a lip is formed between the lip surface and outer surface second step section, press-fitting a sleeve into the bore, the sleeve having an inner surface and an outer surface having a first outer diameter and second outer diameter, and plasma spraying an abradable coating onto the second inner surface of the bore.

Other independent features and advantages of the preferred methods will become apparent from the following detailed description, taken in conjunction with the accompanying drawings which illustrate, by way of example, the principles of the invention.

BRIEF DESCRIPTION OF THE DRAWINGS

FIG. 5 is a cross sectional view of a portion of the compressor housing during a step of the method shown in FIG. 4;

FIG. 6 is an exemplary sleeve that may be used for the method shown in FIG. 4; and FIG. 7 is another cross sectional view of a portion of the compressor housing during another step of the method shown in FIG. 4.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
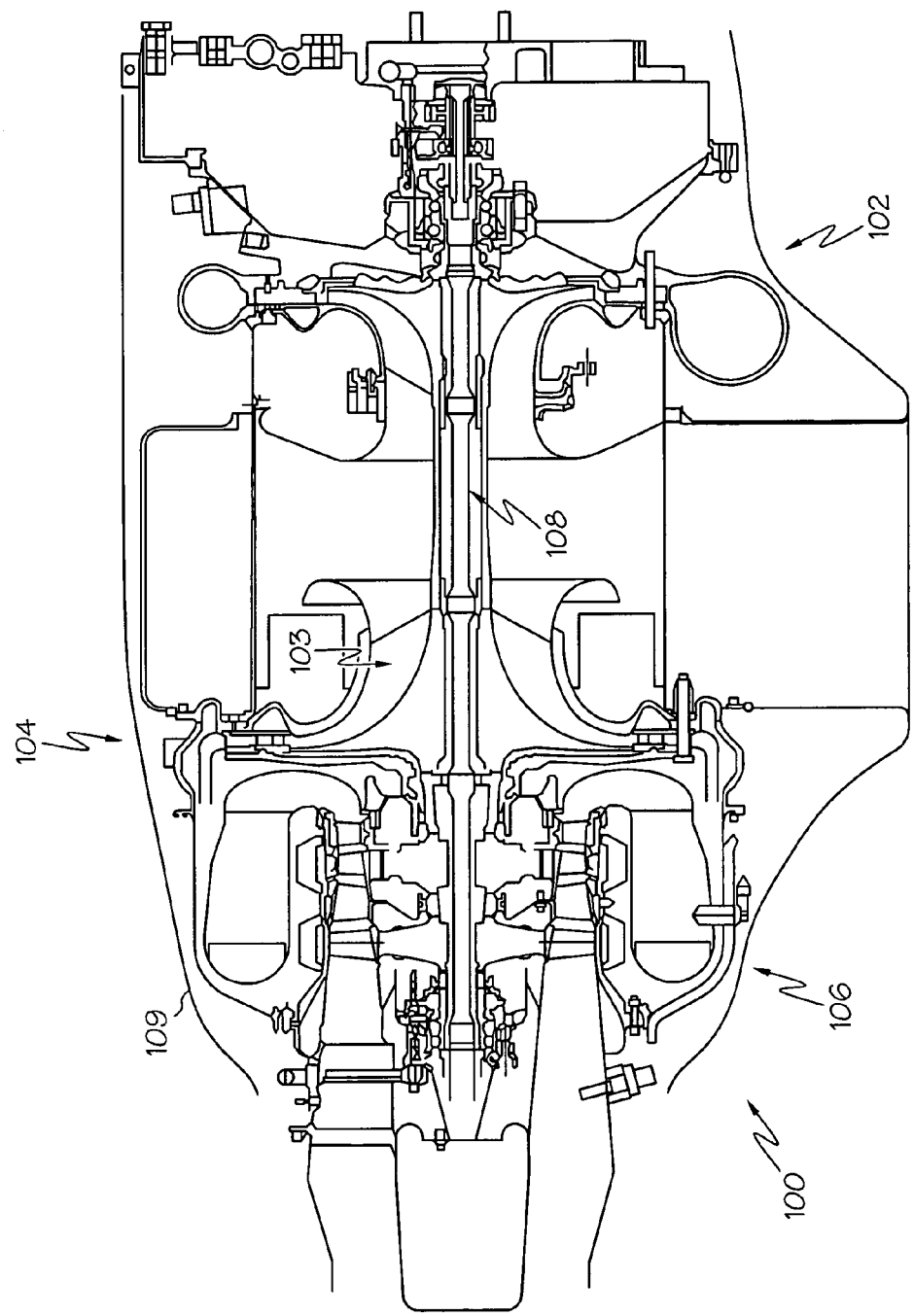
FIG. 1 is a schematic illustration of an exemplary APU.

Turning now to FIG. 1, a schematic illustration of an exemplary APU 100 is provided. The APU 100 includes a compressor 102, an impeller 103, a combustor 104, and a power turbine 106. Each of these is coupled to a shaft 108 and disposed within an APU housing 109. During APU operation, the impeller 103 draws in ambient air, compresses it, and supplies compressed air to one or more additional systems, including, but not limited to, the combustor 104. It will be appreciated that the impeller 103 may be any one of numerous types of compressors now known or developed in the future. When the compressed air enters the combustor 104, it is mixed with fuel from a fuel source (not illustrated) and ignited by a non-illustrated igniter to thereby supply high energy air to the power turbine 106. The high energy air causes the power turbine 106 to rotate. As the power turbine 106 rotates, the shaft 108 rotates as well, which in turn drives the compressor 102.

Figure 2:
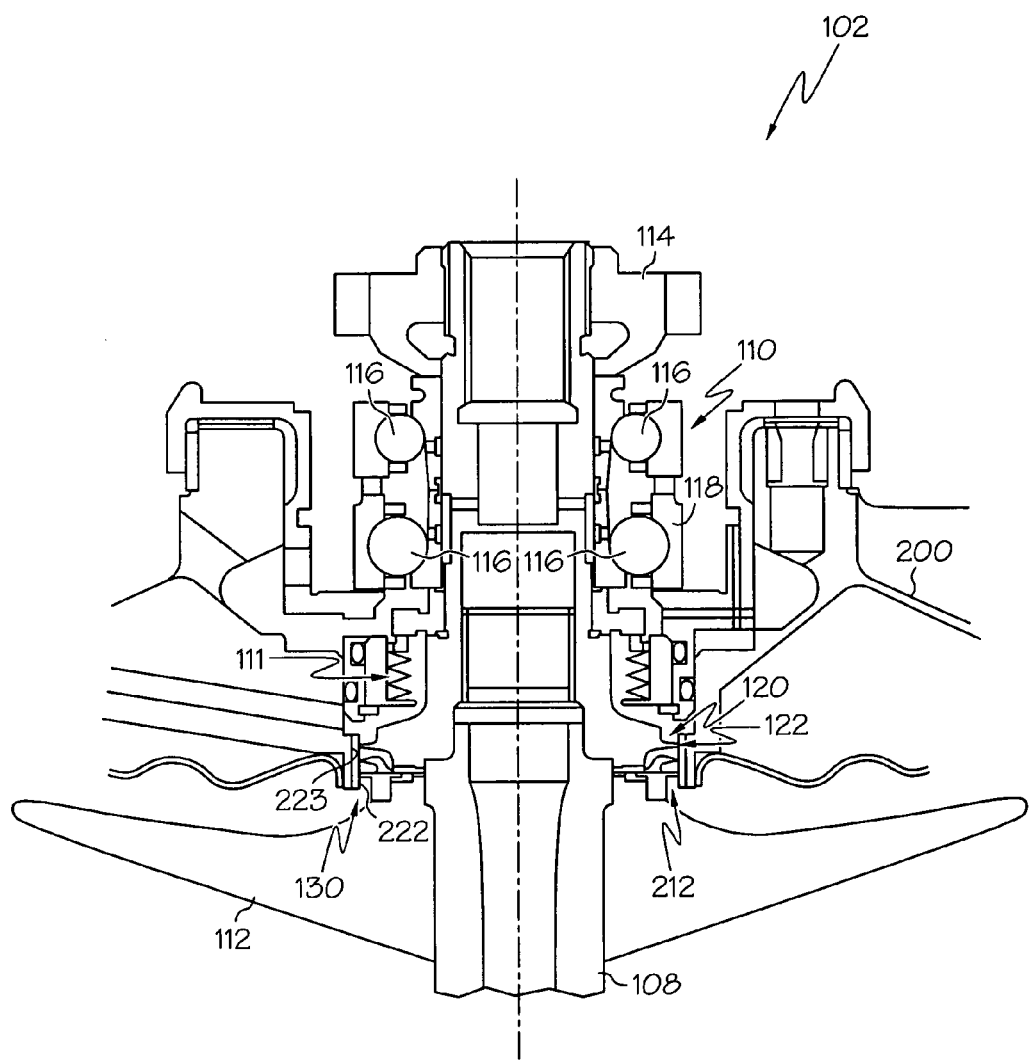
FIG. 2 is a cross section view of a compressor section that may be disposed within the exemplary APU shown in FIG. 1.

FIG. 2 illustrates a cross section view of an exemplary compressor 102. The compressor 102 includes a bearing assembly 110 and a compressor rotor 112, that are each coupled to the shaft 108 and a compressor housing 200 (partially illustrated) that is disposed concentric to the shaft 108. Each of the components is at least partially held in position along the shaft 108 by a nut 114. The bearing assembly 110 acts to support the shaft 108 within the compressor 102. To reduce friction while the shaft 108 rotates, the bearing assembly 110 includes a plurality of bearings 116 that are retained in a bearing housing 118. The bearings 116 are lubricated with a lubricating fluid, such as oil, to further reduce friction. Although the bearing assembly 110 is illustrated as including ball bearings, any one of numerous suitable configurations for reducing friction may be employed. The compressor rotor 112 is configured to rotate with the shaft 108 and to draw air into the compressor 102 to be compressed. To this end, the compressor rotor 112 can have any one of numerous appropriate configurations, such as an impeller, or a hub having a plurality of guide vanes coupled thereto.

Figure 3:
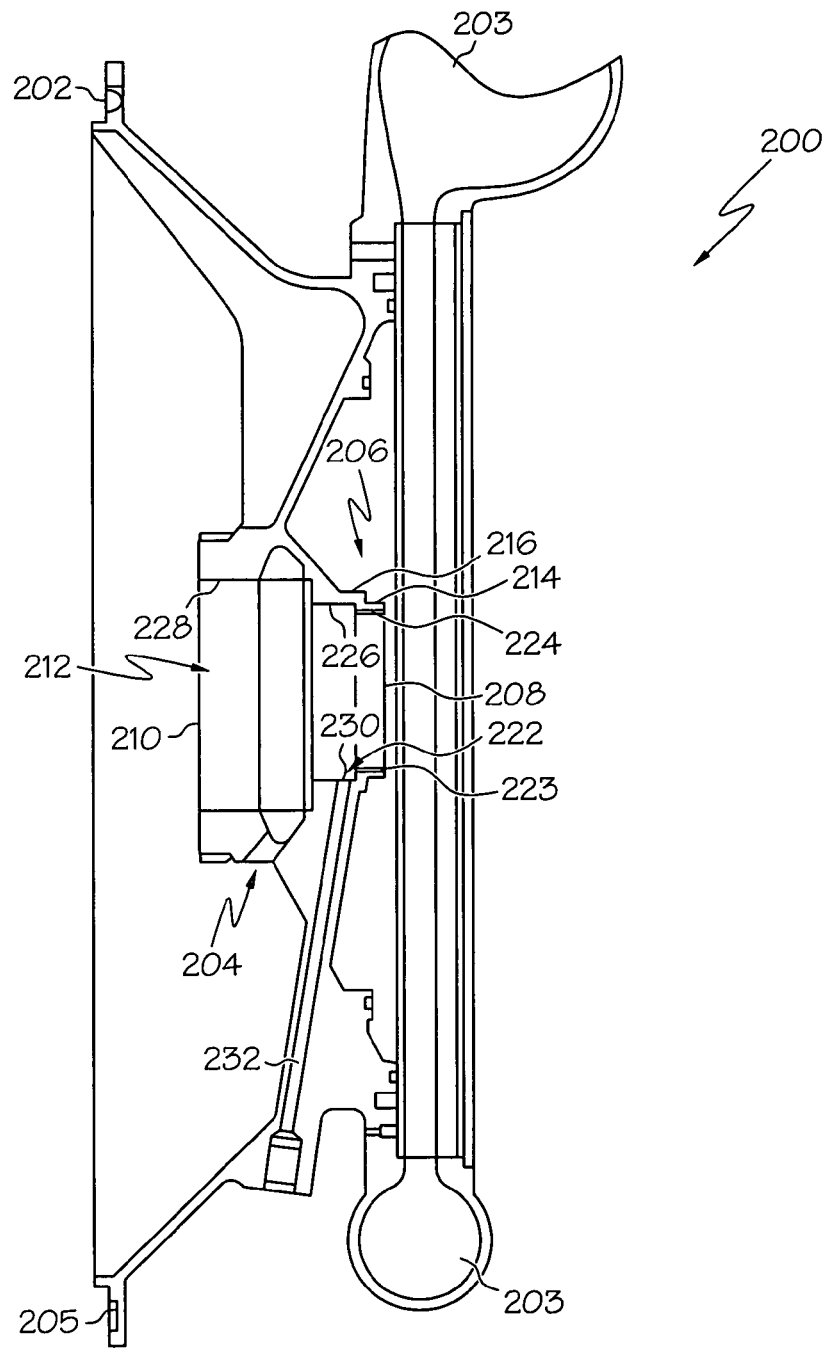
FIG. 3 is a cross section view of an exemplary compressor housing that may be coupled within the compressor section illustrated in FIG. 2.

The compressor housing 200 is configured to prevent the compressed air from entering the bearing assembly 110 and to prevent lubricating fluid from leaking towards the compressor rotor 112. To do so, the depicted compressor 102 includes a knife seal 120 that is coupled to the compressor rotor 112 and disposed between a section of the compressor housing 200. In one embodiment, the compressor 102 also includes a labyrinth seal 111, also coupled to the compressor rotor 112. With reference to FIG. 3, a cross sectional view of an exemplary compressor housing 200 is illustrated. The compressor housing 200 includes a mounting surface 202, an air discharge conduit 203, and a hub 204. The mounting surface 202 mounts the compressor housing 200 to the APU housing 109 and is located along the outer diameter of the compressor housing 200. In the illustrated embodiment, the mounting surface 202 includes a plurality of mounting apertures 205, each configured to receive a suitable fastener; however, it will be appreciated that the mounting surface 202 can have any other configurations capable of mounting the housing 200 to the remainder of the APU 100. The air discharge conduit 203 channels the compressed air from the compressor 102 to other sections of the aircraft, such as, for example, to an air cycle machine. The air discharge conduit 203 is located along the outer periphery of the compressor housing 200 and is generally tubular; however, it will be appreciated that any other appropriate shape may be employed.

The hub 204 is designed to receive the shaft 108, to prevent leakage that may occur between the shaft 108 and the compressor housing 102, and to provide an outlet for any oil that may leak past the labyrinth seal 111. In the embodiment depicted in FIG. 3, the hub 204 includes a stepped outer surface 206, a bore 212, and a knife seal 120 (shown in FIG. 2). The stepped outer surface 206 includes a first step section 214 and a second step section 216. The bore 212 is configured to receive the knife seal 120 and the shaft 108 and has an inner surface 222 that extends between an inlet 208 and outlet 210. In one exemplary embodiment, the inner surface 222 defines a knife seal bore 224, an oil port bore 226, and a bearing housing bore 228, each having a diameter. More specifically, the diameter of the oil port bore 226 is larger than the diameter of the knife seal bore 224 and the diameter of the bearing housing bore 228 is larger than that of the oil port bore 226. The oil port bore 226 includes an oil port 230 that communicates with an oil passage 232 formed in the compressor housing 200.

The knife seal bore 224 is configured to engage the knife seal 120 and thus, includes a coating 223 made of a material that is capable of being abraded, such as, for example aluminum polyester metal spray. With brief reference to FIG. 2, the knife seal 120 includes a plurality of extendable teeth 122 that are mounted to the shaft 108. When the shaft 108 rotates, the teeth 122 extend radially outward and cut into the coating 223. The bore 212 may have any one of numerous configurations that provides a suitable inner surface with which the knife seal 120 may function.

Figure 4:
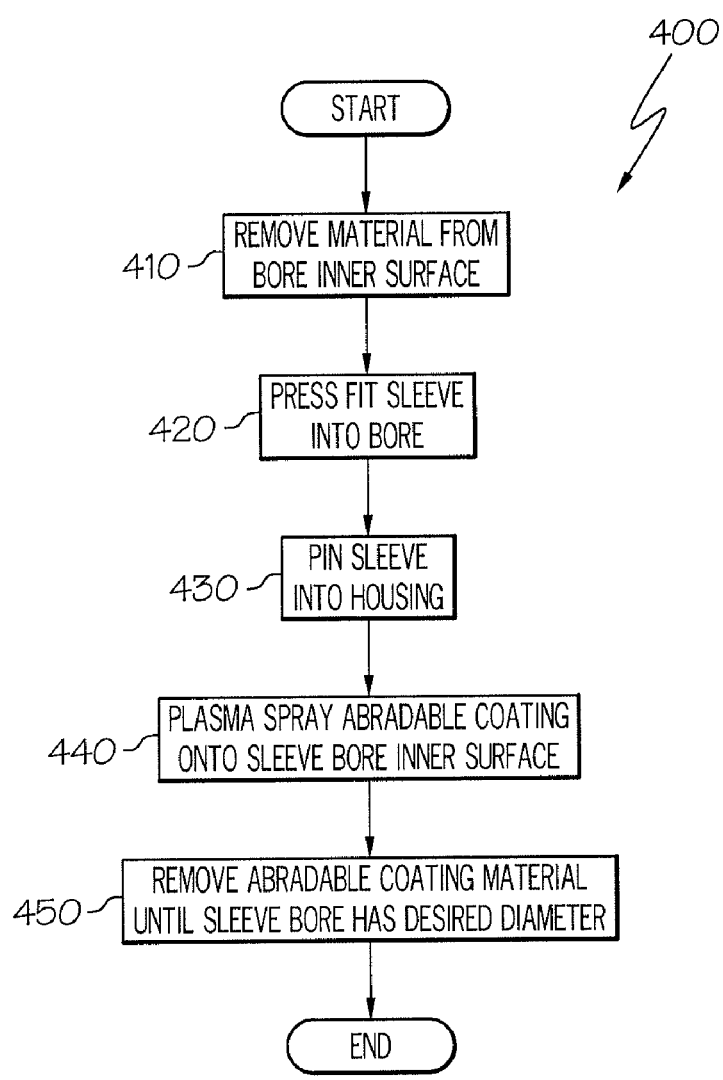
FIG. 4 is a flowchart of an exemplary method that may be used to repair the exemplary compressor housing of FIG. 3.

As previously mentioned, occasionally, the housing bore 212 may need to undergo repair. Turning now to FIG. 4, a flowchart of an exemplary method (400) for repair is depicted. Each step of the process (400) that is depicted in the flowchart is referenced herein by the use of parentheticals. Generally, first, material is removed from the bore inner surface 222 (410). Then, an appropriately configured sleeve is press fit into the bore 212 (420). The sleeve is then glued and pinned into the housing 200 (430). Next, an abradable coating is plasma-sprayed onto the bore inner surface 222 (440). Then, a sufficient amount of abradable coating material is removed until the bore 212 is at least substantially at its original diameter and position (450).

Before any process of the repair can begin, the shaft 108 is removed and studs or fasteners coupling the housing 200 to the other components of the APU 100 are also removed. With reference to FIGS. 3 and 4, once the compressor housing 200 is cleared, the bore 212 is located and material is removed from the bore inner surface 222 in preparation of receiving a sleeve (410). In one exemplary embodiment, the bore inner surface 222 is machined to remove material. In another exemplary embodiment, the machining step (410) includes removing a portion of the housing 200 between the outer surface first step section 214 and the knife seal bore 224 and removing material from the remaining oil port bore 226 to form a sleeve retention surface 234. The sleeve retention surface 234 is shown in FIG. 5. The sleeve retention surface 234 is coupled to a lip surface 238. The diameter of the lip surface 238 is smaller than the diameter of the sleeve retention surface 234 and a lip 240 is formed between the lip surface 238 and outer surface second step section 216. The lip 240 is configured to retain the sleeve within the housing 200, which will be discussed in further detail below.

At some time prior to or during the repair process, a sleeve having appropriate dimensions is obtained. Alternatively, the sleeve can be fabricated. FIG. 6 illustrates an exemplary sleeve that may be used in a preferred embodiment of the exemplary method (400) of repair. The sleeve 650 includes a stepped outer surface 652 and inner surface 654. The stepped outer surface 652 has a first step 656 that is configured to fit within the sleeve retention surface 234 and a second step 658 configured to extend beyond the lip 240. The sleeve inner surface 654 is depicted in this embodiment as having a smooth surface; however, it will be appreciated that the sleeve inner surface 654 may have any one of numerous other shapes, such as stepped (as shown in FIG. 7), that may be suitable, when coupled to the sleeve retention surface 234, for receiving the shaft 108.

The sleeve 650 preferably comprises a non-corrosive, light, strong material having a coefficient of thermal expansion that is substantially similar to that of the compressor housing 200 so that if both the sleeve 650 and housing 200 are exposed to temperatures causing expansion, both will expand at substantially the same rate. Most preferably the sleeve 650 has a coefficient of thermal expansion within about ±2 coefficient units of the housing 200. The sleeve 650 is preferably configured to provide between about 0.001±0.001 inch press fit per 1.0 inch of bore diameter of housing, more preferably between about 0.001±0.0005 inch press fit per 1.0 inch of bore diameter housing, and most preferably between about 0.001±0.0002 inch press fit per 1.0 inch of bore diameter of housing.

In one exemplary embodiment, the sleeve 650 also includes a groove 660 into which an adhesive can be applied. To this end, at least one annular groove 660 is preferably formed into the outer peripheral surface of the sleeve 650. Most preferably two grooves are formed therein, each preferably dimensioned between about 0.04 and 0.08 inches by 0.03 and 0.008 inches. Optionally, the sleeve 650 can additionally include a plurality of holes 662 that are machined therethrough and configured to receive pins. In still another exemplary embodiment, an oil port 664 is marked on the sleeve inner surface 654, the purpose of which will be described in a later step.

Returning to FIG. 4, once an appropriately dimensioned sleeve 650 is obtained, it is press fit into the bore 212 (420). In one embodiment, the housing 200 is heated to expand the diameter of the bore 212 and the sleeve 650 is cooled to reduce its diameter. The sleeve 650 is then pressed into the bore 212 until the sleeve 650 is retained in place by the lip 240. The bore 212 and sleeve 650 can then be heated to a sufficient temperature so that the sleeve 650 expands to fit into the bore 212. In one exemplary embodiment, the sleeve first step 656 is interference fit into the bore 212 and the sleeve second step 658 extends away from the bore 212. In another exemplary embodiment, the sleeve 650 is additionally adhered to the housing (430). To this end, an epoxy resin may be applied to the sleeve grooves 660 before the sleeve 650 is press fit into the bore 212. Then, the sleeve 650 and housing 200 are heated to a temperature such that the epoxy resin cures to provide a leak tight seal therebetween. Optionally, the sleeve 650 is first primed with a suitable lubricant, such as any typically employed for press fitting a surface to a surface.

The sleeve 650 is then fastened to the housing 200 (430). Holes that are configured to receive pins are drilled into the housing and aligned with the pre-drilled holes 662 on the sleeve 650. If no holes have been pre-drilled, then the holes are drilled through the sleeve 650 and into the housing 200. The holes are preferably drilled into the thickest portions of the housing 200 and preferably are not drilled all the way through the housing 200. Pins are then inserted into the holes to further couple the sleeve 650 to the housing 200. Any one of numerous types of pins configured to couple two elements together may be used, however, anti-rotation pins are most preferably used so that the sleeve 650 does not rotate or move within the housing 200.

After the sleeve 650 is press-fit into the housing bore 212, an abradable coating 700, shown in FIG. 7, is plasma-sprayed onto the newly covered bore inner surface 222 (440). The coating 700 is used to provide a surface with which the knife seal 120 may engage. Any one of numerous types of abradable coatings suitable for use for the knife seal 120 may be used, including, but not limited to aluminum/polyester and aluminum silicon composite metal sprays, and any other appropriate coatings. In one example, the coating 700 is sprayed onto the new bore first step section 250.

Next, a sufficient amount of the abradable coating material is removed until the bore 212 is at least substantially at its original diameter and position (450). Optionally, an inspection of the housing 200 is made to detect defects therein. The inspection can be performed via any one of numerous methods, such as, for example, via a fluorescent penetrant inspect. If cracks or defects are detected, they are preferably painted or coated with a repair alloy, such as an aluminum chromate coat with iridite 14-2, or any other type of alloy.

In an alternative embodiment, a sufficient amount of sleeve material is removed until the bore is at least substantially its original diameter and position, and then the sleeve and housing are pinned together.

Thus, a low-cost, effective, easy method of repairing a housing having a bore has been provided. Moreover, the method of repair allows a compressor housing to not only be repaired once, to be repaired over and over again. In particular, if the sleeve is worn away, a new sleeve can be press fit directly on top of the old sleeve.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for repairing a driven compressor housing including a bore having an inner surface configured to engage a shaft-mounted knife seal, the method comprising:
   removing material from the bore inner surface;
   press-fitting a sleeve having a stepped outer surface including a first step and a second step adjacent thereto into the bore such that the first step is press fit within the bore and the second step extends outside of the bore; and
   plasma-spraying an abradable coating onto an inner surface of the press-fit sleeve.

2. The method of claim 1, further comprising pinning the sleeve to the housing.

3. The method of claim 1, wherein:
   the housing has a stepped outer surface;
   the bore inner surface defines a knife seal bore and an oil port bore adjacent thereto;
   the step of removing comprises removing material from the housing between the stepped outer surface and the knife seal bore and the oil port bore to form a sleeve retention surface, a lip surface, and a lip, the sleeve retention surface having a diameter that is greater than the lip surface diameter; and the step of press-fitting comprises press-fitting the sleeve first step with the sleeve retention surface.

4. The method of claim 1, wherein the step of removing comprises removing material from the sleeve second step to form an original bore diameter and position.

5. The method of claim 1, wherein the step of machining the sleeve further comprises forming a groove on the sleeve stepped outer surface.

6. The method of claim 1, further comprising forming an oil port in the sleeve.

7. The method of claim 1, further comprising machining an oil slot into the sleeve, after the step of press-fitting.

8. The method of claim 1, further comprising applying adhesive to the sleeve outer surface, before the step of press-fitting.

9. The method of claim 1, further comprising:
machining at least one pin hole through the housing and sleeve, after the step of press-fitting; and
inserting a pin into the pin hole to secure the sleeve to the housing.

10. The method of claim 1, wherein the abradable coating comprises at least one of aluminum polyester, aluminum silicon, and material having a Rockwell C hardness value $\leqq 20$.

11. A method for repairing a driven compressor housing having a stepped outer surface and a bore configured to engage a shaft-mounted knife, wherein the stepped outer surface has a first step section and a second step section, the bore has an inlet, an outlet, and inner surface extending therebetween, the inner surface having a knife seal bore and an oil port bore adjacent thereto, wherein the diameter of the knife seal bore is smaller than the diameter of the oil port bore, the method comprising:
removing a section of the housing between the outer surface first step section and the knife seal bore to form a sleeve retention surface, a lip surface adjacent thereto, wherein the lip surface has a diameter that is smaller than a diameter of the sleeve retention surface;
press-fitting a sleeve into the bore, the sleeve having an inner surface and an outer surface, the sleeve outer surface having a first step and a second step adjacent thereto, the sleeve first step press-fit into the bore and the sleeve second step extending away from the bore;
plasma spraying an abradable coating onto the inner surface of the press-fit sleeve; and
removing a portion of the sleeve such that the bore has an original diameter and position.

12. The method of claim 11, further comprising forming an oil port in the sleeve.

13. The method of claim 12, further comprising machining an oil slot into the sleeve, after the step of press-fitting.

14. The method of claim 11, wherein the step of machining the sleeve further comprises forming a groove on the sleeve outer surface.

15. The method of claim 11, further comprising applying adhesive to the sleeve stepped outer surface before the step of press-fitting.

16. The method of claim 11, wherein the step of press-fitting comprises forming an interference fit between the sleeve and the bore.

17. The method of claim 11, further comprising:
machining at least one pin hole through the housing and sleeve, after the step of press-fitting; and
inserting a pin into the pin hole to secure the sleeve to the housing.

18. The method of claim 11, wherein the abradable coating comprises at least one of aluminum polyester, aluminum silicon, and material having a Rockwell C hardness value $\leqq 20$.

* * * * *